United States Patent [19]

Carollo

[11] Patent Number: 5,121,788
[45] Date of Patent: Jun. 16, 1992

[54] SELF CONTAINED HEAT EXCHANGE APPARATUS

[75] Inventor: Glenn M. Carollo, Green Bay, Wis.

[73] Assignee: Miller Electric Mfg. Co., Appleton, Wis.

[21] Appl. No.: 422,225

[22] Filed: Oct. 16, 1989

[51] Int. Cl.⁵ .............................. F28F 7/00; B23K 9/28
[52] U.S. Cl. ..................................... 165/47; 165/122; 165/104.31; 219/137.62; 219/121.49; 392/358; 392/496
[58] Field of Search ................ 165/122, 47, 152, 153, 165/104.31; 392/358, 357, 496; 219/137.62, 121.49

[56]  References Cited
U.S. PATENT DOCUMENTS

| | | |
|---|---|---|
| 1,189,470 | 7/1916 | O'Brien . |
| 1,884,095 | 10/1932 | Modine ............................. 165/122 |
| 2,025,216 | 12/1935 | Opitz . |
| 2,200,214 | 5/1940 | Carter ............................. 165/122 |
| 2,707,868 | 5/1955 | Goodman ......................... 165/150 |
| 2,995,647 | 8/1961 | Bernard ........................... 219/137.62 |
| 3,196,939 | 7/1965 | Erbe et al. . |

FOREIGN PATENT DOCUMENTS 489445  1/1954  Italy .................................... 165/122

Primary Examiner—Albert W. Davis, Jr.
Attorney, Agent, or Firm—Foley & Lardner

[57]  ABSTRACT

A self-contained heat exchange system (10) is provided wherein the fan (14), pump (18), radiator (30), and motor (16) are disposed within a cylindrical flow path (40) defined by a resilient housing (12). In accordance with a preferred embodiment, the housing (12) comprises a double walled, generally annular fluid reservoir (46). Accordingly, the inside wall (44) of the housing defines the airflow path (40), thereby maximizing heat exchange efficiency per unit volume of heat exchange fluid. Moreover, the annular character of the fluid tank (12) in conjunction with the disposition of the pump (18) within the airflow path (40) defined by the annulus, ensures that the pump (18) is always in a primed condition.

17 Claims, 4 Drawing Sheets

SELF CONTAINED HEAT EXCHANGE APPARATUS

TECHNICAL FIELD

The present invention relates, generally, to recirculating coolant heat exchange systems, and more particularly to a double walled annular fluid reservoir having a fan and a radiator disposed along a common axis therewith and configured to facilitate maximum heat exchange capacity per unit volume of heat exchange fluid.

BACKGROUND ART AND TECHNICAL PROBLEMS

Self-contained heat exchangers comprising a fluid reservoir, fan, motor, and radiator are well known. See, for example, U.S. Pat. Nos. Erbe et al. 3,196,939 issued Jul. 27, 1965 and Opitz 2,025,216, issued Dec. 24, 1935. In addition, O'Brien 1,189,470 discloses a generally cylindrically shaped air cooler and dehumidifier including a single length of pipe for carrying a heat exchange fluid, the pipe being arranged to form a plurality of spaced apart, concentric coils. The coils are arranged with a common horizontal axis, forming a plurality of air passages coaxially aligned with a central air passage.

Presently known self-contained heat exchange systems are unsatisfactory in several regards. For example, systems wherein the fluid pump is external to the airflow path do not maximize heat convection from the pump. Moreover, to the extent the heat exchange surface of the fluid reservoir is isolated from the airflow path, heat exchange efficiency may be impaired.

In addition, many existing systems are constructed with fluid circulation tubing and fittings on the outside surface of the heat exchanger, rendering these components susceptible to damage from inadvertent contact with external sources.

SUMMARY OF THE INVENTION

The present invention provides a self-contained recirculation coolant system which maximizes heat exchange efficiency yet which is inexpensive to manufacture. In accordance with a preferred embodiment of the system, a double-walled annular fluid reservoir defines an internal airflow path wherein the fan, radiator, fluid pump, and motor for driving the fan and pump are diposed. The fluid reservoir functions as the frame, fan shroud, and carrying case. The radiator grid and the surfaces of the fluid reservoir proximate the airflow path utilize convection, conduction, and radiation, whereas the heat exchange surfaces of the tank which are shielded from the airflow path utilize conduction and radiation in the heat exchange process.

The heat exchanger in accordance with the present invention is particularly well adapted for use with hand tools or machines which generate large amounts of heat. For example, a gas metal arc welding (GMAW) torch, a hand-held welding tool, requires highly efficient cooling. However, because of the nature of the operations in which GMAWs are typically employed, for example in the on-site repair and construction of machinery, a lightweight, compact, portable heat exchanger is needed.

DETAILED DESCRIPTION OF PREFERRED EXEMPLARY EMBODIMENTS

Figure 7:
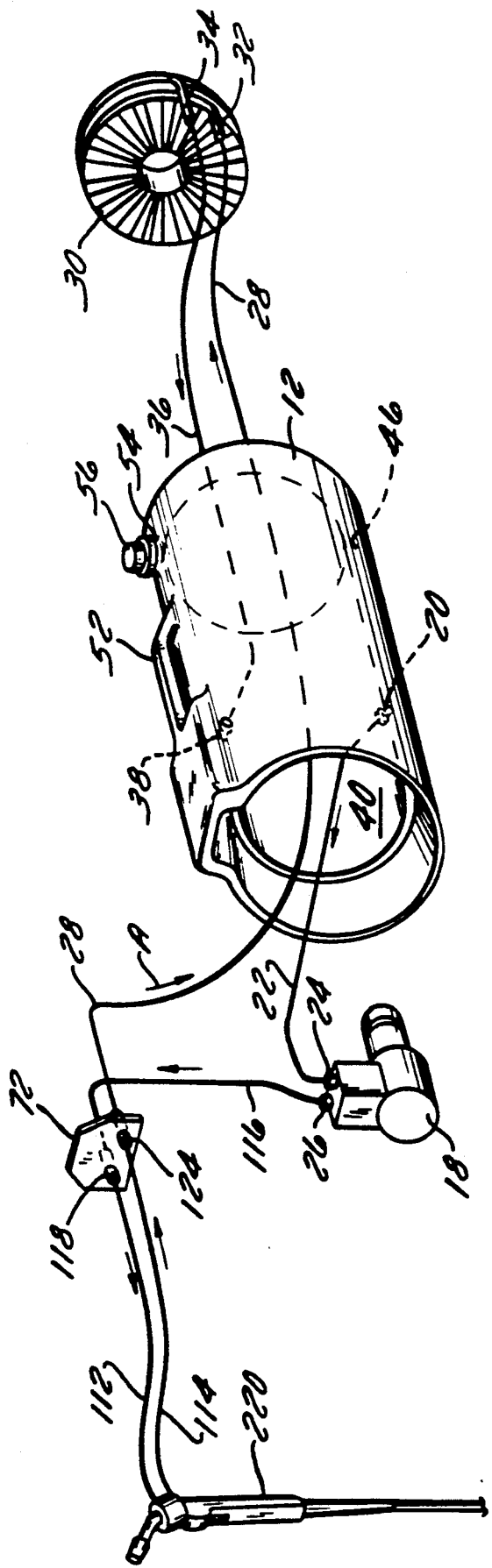
FIG. 7 is a schematic diagram of the hydraulic circuit in accordance with a preferred embodiment of the present invention.

With momentary reference to FIG. 7, a schematic representation of the hydraulic circuit in accordance with a preferred exemplary embodiment of the invention includes a fluid reservoir 46 having a discharge port 20 and a return port 38, wherein heat exchange fluid flows in the direction of the arrows A. A pump 18 draws fluid from reservoir 46 and ports the fluid to a tool inlet tap 118 disposed on a top support plate 72. Respective first and second tool conduits 112, 114 carry the fluid to and from a tool 220. Return line 114 terminates at a radiator 30. Upon being discharged from radiator 30, the fluid returns to reservoir 36 via inlet port 38.

Figure 1:
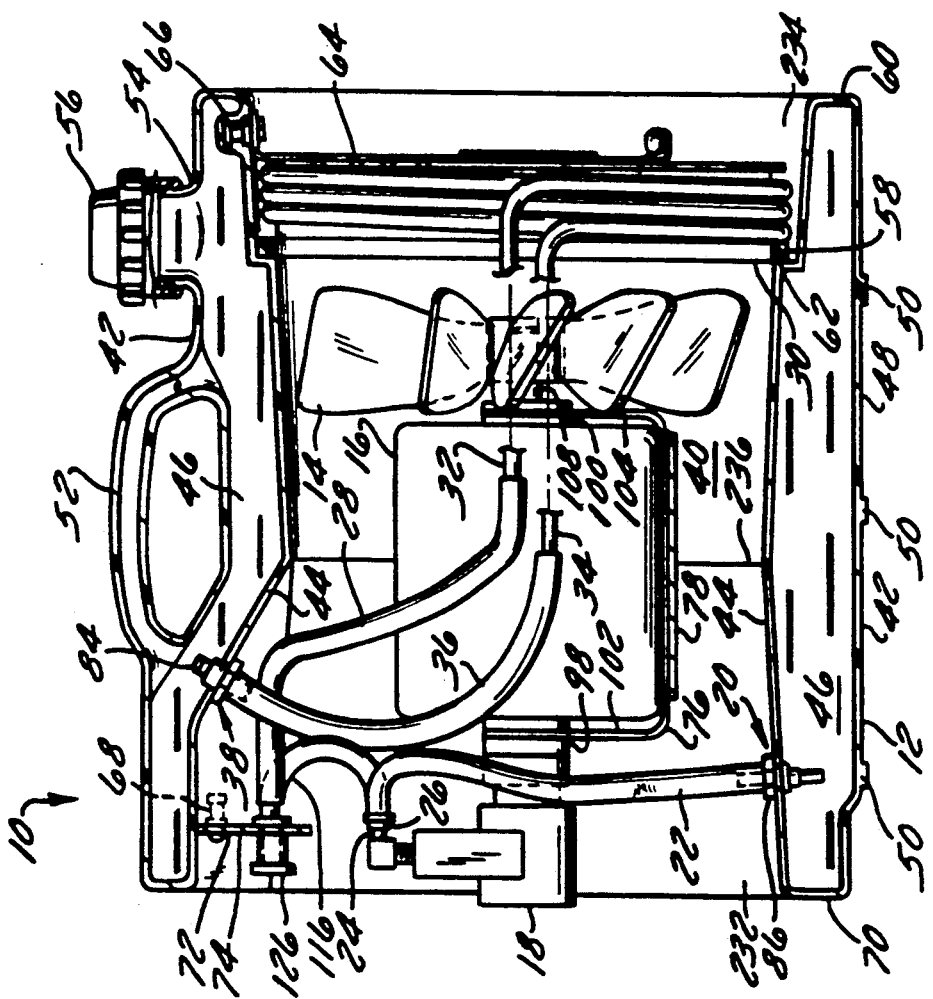
FIG. 1 is a partially cut away side view of the heat exchange system in accordance with the present invention.
Figure 2:
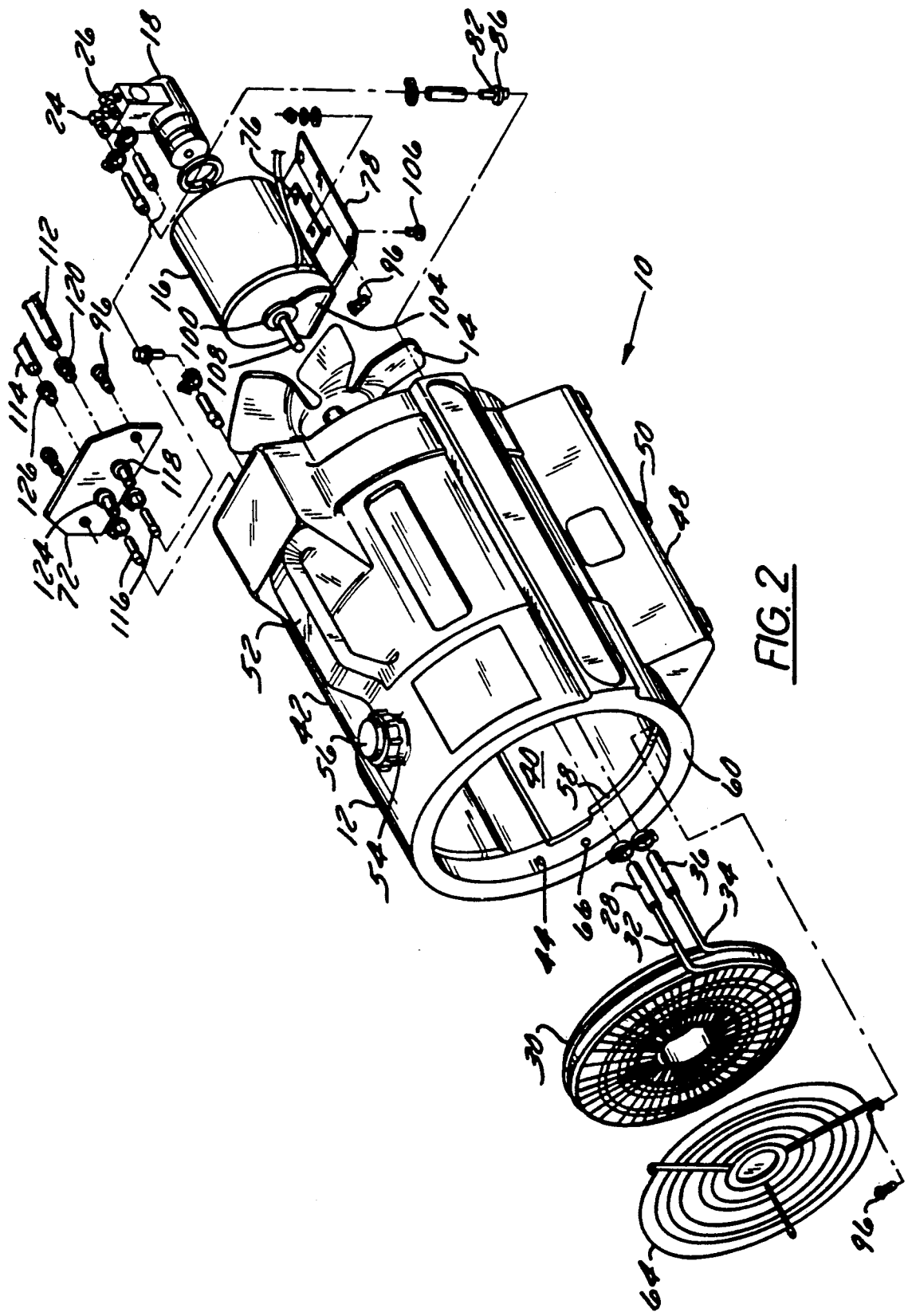
FIG. 2 is an exploded perspective view of the component parts of the heat exchange system in FIG. 1.
Figure 3:
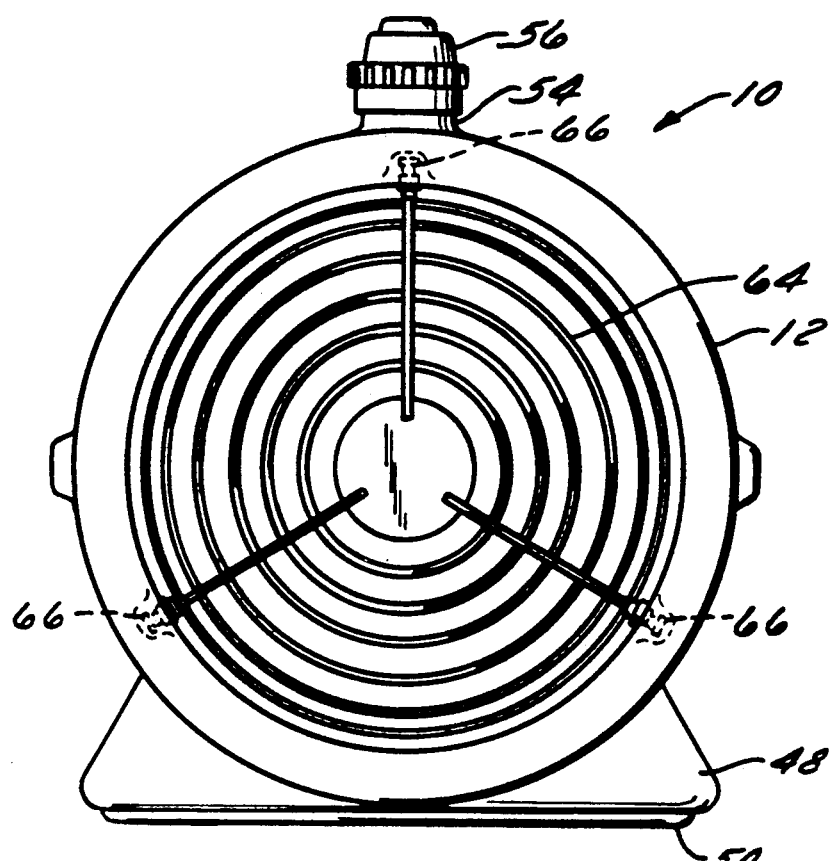
FIG. 3 is a front end elevation view of the heat exchange system in FIGS. 1-2.

Referring now to FIGS. 1 and 2, an exemplary heat exchange system 10 illustratively includes a double walled, generally annular tank 12, a heat exchanger (radiator) 30, a fan 14 driven by a motor 16, and a pump 18, also driven by motor 16.

During operation, pump 18 draws heat exchange fluid from tank 12 at a tank discharge port 20, through a first conduit 22, and into pump 18 through a pump inlet port 24. The fluid is discharged from pump 18, at a pump discharge port 26, and pumped through a workpiece 220 (not shown in FIGS. 1-2; see FIG. 7), for example a GMAW torch. The fluid thereafter enters second fluid conduit (plumb line) 28 whereupon the fluid enters radiator 30 at a radiator inlet port 32. The fluid is then urged through a radiator discharge port 34, through a third fluid conduit 36, and back to tank 12 at a tank inlet port 38.

Housing 12 illustratively defines a generally cylindrical airflow region 40 within which motor 16, fan 14, pump 18, radiator 30, and the respective fluid conduits are housed. Thus, thermal energy is ejected from the system as the fan air flows over these components. Consistent with traditional operating principles, however, the primary source of thermal flux is radiator (heat exchanger) 30.

Housing 12 suitably comprises an outer semicylindrical wall 42 and an inner, generally cylindrical wall 44 defining a generally annular fluid chamber 46 therebetween. A base 48, integral with outer wall 42, advantageously includes respective lateral supports 50 disposed approximately perpendicular to the longitudinal axis of the heat exchanger. In the event it is desirable to place the unit on a machine, table, or the like, which may have bolts, screws, or rivets, for example, extending upwardly therefrom, base supports 50 provide a predetermined amount of clearance between the top of the machine and the bottom of base 48 to accommodate the protrusions.

Housing 12 advantageously includes a double-walled handle 52 and a fill spout 54. A conventional antisplash cap 56 may be used to cover spout 54, thereby permitting chamber 46 to remain at approximately atmospheric pressure during use.

Referring now to FIGS. 1-4, housing 12 further comprises a circular step 58 extending along inside wall 44 near a front end 60 of housing 12. The inner diameter of step 58 is preferably less than the outside diameter of radiator 30 by an amount sufficient to prevent radiator 30 from entering housing 12 beyond step 58. This feature protects fan 14 from damage in the event the heat exchanger is dropped or, alternatively, in the event radiator 30 is inadvertently impact loaded in the direction of fan 14.

One or more strips of a resilient shock absorbing material 62, for example conventional household weatherstripping, may be disposed between step 58 and radiator 30. A grill 64, for example a screen or wire grate, is disposed in contact with radiator 30 proximate front end 60 of housing 12. A plurality of grill support inserts 66 are spaced about inner wall 44 to secure grill 64 in place. Additional stripping 62 may be disposed between inner wall 44 and the perimeter of radiator 30 and, additionally, between radiator 30 and grill 64, as desired. Shock mounting radiator 30 within housing 12 in this manner allows the unit to withstand large impact forces without damage.

Figure 4:
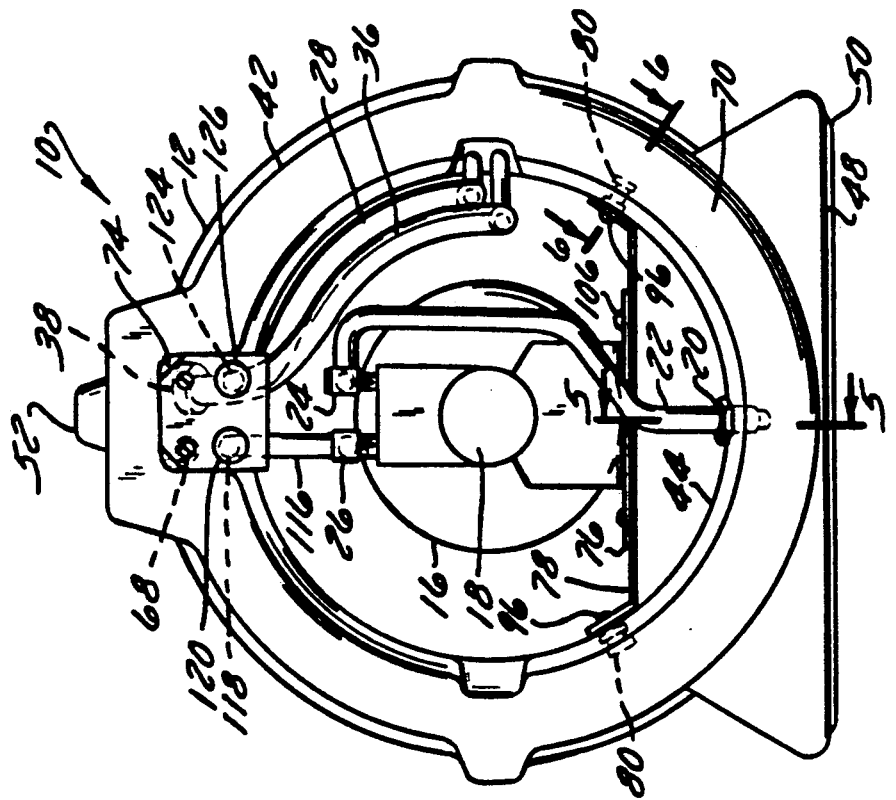
FIG. 4 is a rear end elevation view of the heat exchange system in FIGS. 1-3.

One or more plate support inserts 68 are embedded in a rear end 70 of housing 12 for supporting a plumb plate 72, described in detail below. As best seen in FIG. 4, plate support inserts 68 may be embedded within the upper portion of the annular region of rear end 70 or, alternatively, within a raised plate surface 74 advantageously disposed on the top portion of housing 12 intermediate handle 52 and rear end 70.

With particular reference to FIG. 4, motor 16 is suitably mounted within housing 12 by a motor support bracket 76 and a motor mounting bracket 78. A plurality of bracket mounting inserts 80, for example two on each side of motor 16, are embedded within inner wall 44 of housing 12.

Figure 5:
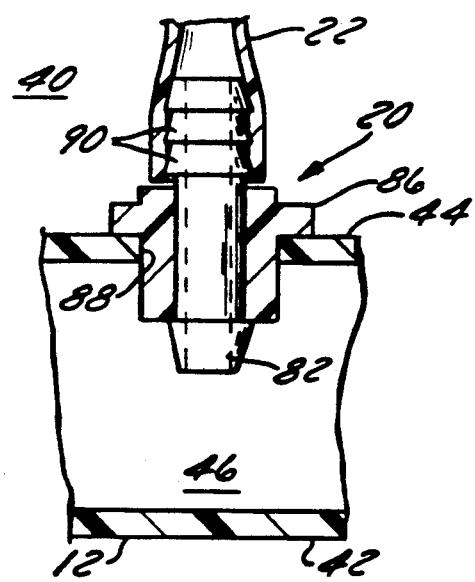
FIG. 5 is a cross section view of a fitting assembly taken along line 5—5 in FIG. 4.

With reference to FIGS. 1 and 5, tank discharge port 20 advantageously comprises an aperture 88 formed in inner wall 44 of housing 12. A resilient bushing 86, made for example from rubber or a resiliently pliable plastic, is disposed within aperture 88. Aperture 88 may be a hole having a circular cross section, for example, in which case the portion of bushing 86 which extends through hole 88 is desirably generally cylindrical. Bushing 86 may be secured within hole 88, and a fitting 82 may be secured within bushing 86, in any convenient manner, for example by frictional engagement through an interference or press fit, or by a suitable adhesive.

Fitting 82 may be made from any rigid or semi-rigid material, for example brass, copper, or galvanized or zinc plated steel, and suitably includes one or more barbs 90 to facilitate engagement with conduit 22. Fitting 82 includes an internal bore or conduit extending therethrough to thereby maintain fluidic communication between chamber 46 and conduit 22. Tank inlet port 38, comprising a fitting 84, is desirably constructed in a manner similar to port 20.

Figure 6:
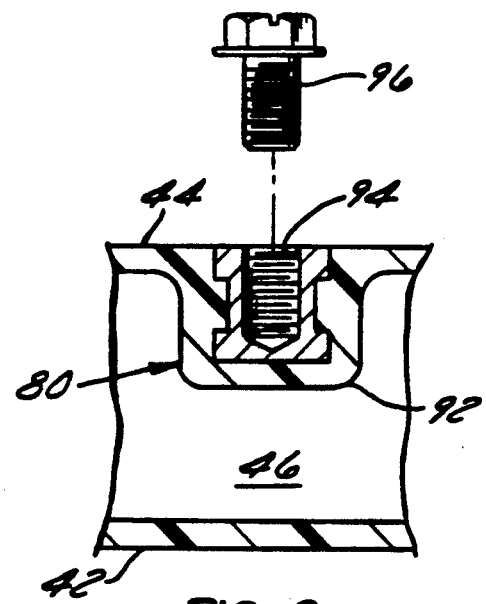
FIG. 6 is a cross section view of an insert taken along line 6—6 in FIG. 4.

Referring now to FIGS. 4 and 6, respective bracket inserts 80 suitably include an insert mount 92 which comprises a local extension of inner wall 44 into reservoir 46. A fastener 94, for example a threaded nut, is rigidly embedded within mount 92. Hence, motor mounting bracket 76 may be mounted to inner wall 44 by respective bolts 96 extending through respective holes in bracket 78 into respective fasteners 94. Plate support inserts 68 and grill inserts 66 are suitably similar to bracket inserts 80, such that plate 72 may be secured to plate surface 74, and grill 64 may be secured to inner wall 44, with respective bolts 96.

In accordance with one aspect of the present invention, the entire volume of housing 12 comprising chamber 46, defined by inner wall 44, outer wall 42, front end 60, and rear end 70, may be filled with heat exchange fluid. As such, the need for a separate reservoir tank and cover is avoided, thereby reducing the number of parts, cost, assembly time, and weight associated with the unit. In addition, heat exchange efficiency is promoted inasmuch as the entire surface area of housing 12 comprises a heat exchange surface: outer wall 42, base 48, handle 52, and respective front and rear ends 60 and 70 exchange heat via conduction and radiation; and inner wall 44 exchanges heat through conduction, radiation, and convection.

In accordance with another aspect of the present invention, housing 12 suitably comprises a resilient shell made from, for example, plastic, rubber, or either cross-linked or non-crosslinked polyethylene, polypropylene, polyurethane, PVC, and various copolymers thereof. In addition, housing 12 may be fabricated by rotational or injection molding techniques, in which case it may be desirable to fabricate housing 12 in two separate components, subsequently joining the respective parts along a convenient seam.

A molded housing is particularly desirable in view of the grill, plate, and bracket inserts described above. Specifically, respective insert mounts 92 may comprise part of the molded structure, wherein respective fasteners 94 are placed in the housing mold (not shown) and the shell material is thereafter molded around fasteners 94, forming insert mounts 92. In this way, reliable fasteners are provided at low cost and with a minimum likelihood of leakage. The use of molded inserts further reduces the incidence of corrosion inasmuch as the inserts, fasteners, and bolts are isolated from the heat exchange fluid.

As best seen in FIG. 1, manufacturing costs may be reduced by providing a molded housing comprising respective mating shell portions 232, 234 joined about a dividing line 236 extending in a direction transverse to the fan axis. Dividing line illustratively defines a common apex about which respective inside and outside walls 42, 44 are fused together. Inside wall advantageously exhibits a draft, for example on the order of about minus three degrees (−3°) or more, from line 236 to each of respective ends 60, 70 of housing 12.

In accordance with one aspect of the present invention, the aforementioned draft facilitates convenient removal of respective shell portions 232, 234 from the molding apparatus. In addition, heat exchange efficiency may be enhanced to the extent fan 14 is disposed proximate line 236. In this way, the portion of inside wall 44 in the vicinity of line 236 functions as a highly efficient fan shroud.

Returning to FIGS. 1, 2 and 4, motor 16 suitably comprises a double shafted, one-quarter (¼) horsepower motor, for example model no. CA55EDY-2646 made by the Emerson Company of St. Louis, Mo. Motor 16 further comprises respective collars 98 and 100, configured for receipt within and rigid engagement by respective rails 102 and 104 of support bracket 76.

Support bracket 76 may be secured to mounting bracket 78 in any convenient manner, for example by a plurality of bracket bolts 106. Mounting bracket 78 is secured to inner wall 44 by respective fasteners 94 and fastener bolts 96 at respective bracket inserts 80, as discussed above in connection with FIG. 6.

With continued reference to FIGS. 1 and 2, fan 14 is suitably attached to and driven by a fan shaft 108 extending from motor 16. As best seen in FIG. 1, the fan blades terminate proximate inner wall 44 of housing 12. Moreover, in the vicinity of fan 14, inner wall 44 has a substantially circular cross section in a plane orthogonal to the axis of shaft 108 and a generally linear cross section in a plane parallel to the axis of shaft 108. Consequently, inner wall 44 defines a fan shroud in the vicinity of fan 14, eliminating the need for an additional shroud assembly. Thus, heat exchange efficiency is further promoted inasmuch as recirculation airflow currents (eddy currents) are eliminated.

Pump 18 is driven by a pump drive shaft (not shown) which extends from the end of motor 16 opposite fan 14. Pump 18 suitably comprises a positive displacement pump, for example model no. C01304XH, manufactured by the Procom Company of Murpheesboro, Tenn. Pump 18 is advantageously mounted to motor 16 by a conventional carbonator mount.

In accordance with a further aspect of the invention, heat exchanger 10 may be used in conjunction with a variety of hand tools, for example GMAW and GTAW torches. With reference to FIGS. 2 and 4, a GMAW gun (tool) 220 (not shown in FIGS. 1-6; see FIG. 7) generates large amounts of heat during use. During steady state operation, a tool inlet conduit 112 carries heat exchange fluid from heat exchanger 10 to the tool, and a tool discharge conduit 114 carries the fluid back to the heat exchanger for cooling.

More particularly, a first plumb line 116 connects pump discharge port 26 to a tool inlet tap 118 disposed on plumb plate 72. When the heat exchanger is not in use, a first cap 120 prevents flow through tool inlet tap 118. During use, tool inlet conduit 112 is connected to tap 118 in any convenient manner, for example by a threaded fastener or a quick-disconnect mechanism.

A second plumb line (conduit) 28 connects radiator inlet port 32 to a tool discharge tap 124, also conveniently disposed on plumb plate 72. During operation of heat exchanger 10 with tool 220, tool discharge conduit 114 carries the heat exchange fluid from the tool, through plumb line 28, and back to radiator 30. A tool discharge tap cap 126 is provided to prevent flow into or out of tap 124 during periods of nonuse.

Although the above-described heat exchange system is illustrated in connection with a GMAW torch, it will be appreciated that the system may be employed to cool (or heat) a wide variety of apparatus with respect to which it is desirable to control thermal flux. Alternatively, heat exchange system 10 may be used as an air heater or air cooler by connecting tap 124 to an appropriate source of hot or cold fluid, as desired. A bypass conduit (not shown) may also be used to connect pump discharge port 26 to radiator inlet port 32 in the event system 10 is operated without a workpiece.

Referring now to FIGS. 1, 2, and 4, pump discharge port 26 and radiator inlet port 32 are disposed within airflow region 40 near the longitudinal axis thereof. Tool inlet tap 118 and tool discharge tap 124, on the other hand, are located on plumb plate 72, illustratively near the top of housing 12. Tap 118 and port 26 are connected by upwardly extending plumb line 116; radiator inlet port 32 and tap 124 are connected by upwardly extending conduit 28. By this arrangement, the point of fluid discharge to the workpiece (tap 118) is maintained at a higher elevation than the pump, thereby preventing fluid leakage from the system down to pump level when tool inlet conduit 112 and cap 120 are removed from tool inlet tap 118. Similarly, the point of fluid return from the workpiece to the heat exchange system (tap 124) is maintained at a higher elevation than radiator inlet port 32, thereby preventing leakage when conduit 114 and cap 126 are removed from tap 124.

In contrast to many prior art systems in which the pump is elevated with respect to the fluid reservoir, the pump in accordance with the present invention does not run "dry" during start-up, thereby increasing pump life. With continued reference to FIGS. 1, 2, and 4, pump 18 is beneficially disposed within airflow passage 40, which passage is substantially defined by housing walls 42 and 44. Hence, a significant portion of the fluid contained within annular reservoir 46 is at a higher elevation than pump 18. The force produced by gravity on this elevated fluid urges fluid through tank discharge port 20, up conduit 22, and into pump inlet port 24 regardless of whether pump 18 is operating. Consequently, pump 18 remains in a primed condition as long as the level of fluid in tank 12 is higher than conduit 22.

An additional advantage of the illustrated system in accordance with the present invention surrounds the known fact that heat exchange media, for example ethylene glycol or tap water, typically contain additives or mineral deposits. In systems wherein the pump is not always primed, the heat exchange fluid may evaporate, leaving additive or mineral deposits within the pump. When the pump is started, these deposits can inhibit pump function, particularly if the pump runs dry for a period until it is primed. These problems are avoided in accordance with the present invention wherein the pump and reservoir are configured such that the pump is constantly primed.

Furthermore, the disposition of the pump, motor, fan, fittings, conduits, fan shroud, grill, and inserts within airflow region 40 minimizes the possibility of accidental damage to these parts. Moreover, inasmuch as housing 12 is advantageously made of a resilient material, the shock absorption capacity of the system is further enhanced. The large volume of water contained in reservoir 12, for example ten (10) to twenty-five (25) liters, further increases the shock resistant character of the system.

It will be understood that the above description is of preferred exemplary embodiments of the present invention and that the invention is not limited to the specific forms shown. For example, the housing may be of any convenient shape, such as rectilinear, hemispherical, or the like. Further, it is not necessary that all components and fluid connections be disposed within the housing, to the extent manufacturing and accessability considerations may dictate otherwise. Moreover, although the workpiece inlet and discharge conduits are illustratively disposed hydraulically intermediate the pump and radiator, it will be appreciated that these components may be configured in any convenient manner such that a pump (or pumps) circulate the fluid through the workpiece. These and other modifications may be made in the design and arrangement of the components without departing from the spirit of the invention as expressed in the appended claims.

I claim:

1. A heat exchange apparatus, comprising:
   a resilient housing including:
      an inside wall having a generally circular cross section along a substantial portion of the length thereof and configured to define an airflow path; and
      an outside wall cooperating with said inside wall to form a fluid reservoir therebetween;
   a motor assembly, including bracket means for securing a motor to said inside wall within said airflow path;
   a radiator configured to circulate a heat exchange fluid therethrough;
   means cooperating with said motor, for urging the heat exchange fluid from said reservoir, through said radiator, and back to said reservoir; and
   a fan driven by said motor and disposed within said airflow path, configured to direct an airstream against said radiator and along the surface of said inside wall.

2. The apparatus of claim 1 wherein said urging means comprises a pump mounted to said motor and disposed within said airflow path, said pump including an inlet port and a discharge port, said apparatus further comprising:
   a plumb plate disposed at a higher elevation than said pump and including respective inlet and discharge taps disposed to cooperate with a workpiece;
   a first plumb line extending from one of said pump inlet and discharge ports to one of said inlet and discharge taps and configured to permit fluidic communication therebetween; and
   a second plumb line extending from said circulating means to the other of said inlet and discharge taps and configured to permit fluidic communication therebetween.

3. The apparatus of claim 2, wherein:
   said housing means further comprises a tank discharge port and said apparatus further comprises a priming conduit extending between said tank discharge port and the other of said pump inlet and discharge ports; and
   wherein a substantial portion of said reservoir is disposed at a higher elevation than said pump and said priming conduit.

4. The apparatus of claim 1 wherein said housing further includes a plurality of inserts comprising a female fastener embedded within said resilient housing material, and wherein said inserts cooperate with a plurality of male fasteners to secure said motor to said housing.

5. The apparatus of claim 1 wherein:
   a portion of said inside wall which comprises said generally circular cross section further comprises a generally linear cross section in a plane transverse to said circular cross section, said portion being disposed proximate said inside wall to thereby form a fan shroud about the perimeter of said fan; and
   wherein said inside wall further comprises a step disposed proximate said fan, said apparatus further comprises a grill secured to said inside wall of said housing, and said radiator is secured between said step and said grill.

6. A self-contained heat exchange system, comprising:
   a housing having outer and inner walls defining a fluid reservoir therebetween, said inner wall further defining an internal passage in said housing extending from a front end opening in said housing to a rear end opening therein, said passage providing an air flow path between said openings;
   a heat exchanger disposed proximate said air flow path for changing the temperature of a heat exchange fluid circulating through said heat exchanger;
   a fan secured to said housing proximate said air flow path configured to generate an air stream along the length of said air flow path such that said air stream flows past said heat exchanger;
   a pump secured to said housing; and
   conduit means connecting said reservoir, pump, and heat exchanger, including an outlet for providing heat exchange fluid to an external device requiring heating or cooling and an inlet for return of the heat exchange fluid from said device, with means for opening and closing said inlet and outlet, thereby permitting circulation of the heat exchange fluid between the external device and said heat exchanger when the device is connected to said outlet and inlet, said reservoir, pump, device, heat exchanger, and conduit means constituting a closed fluid transfer system through which the heat exchange fluid is circulated by said pump;
   wherein said conduit means includes a first conduit connecting a discharge port on said housing to an inlet port of said pump, a second conduit connecting a discharge port of said pump to said outlet, a third conduit connecting said inlet to said heat exchanger, and a fourth conduit connecting said heat exchanger to an inlet port of said housing, whereby said pump can circulate heat exchange fluid sequentially from said reservoir, through said pump, then through the device connected to said inlet and outlet, then through said heat exchanger, and thereafter back to said reservoir.

7. A heat exchanger as defined in claim 6, wherein said fan and pump are configured to operate from a single drive means.

8. A heat exchanger as defined in claim 7, wherein said drive means is an electric motor disposed within said air flow path.

9. A heat exchanger as defined in claim 6, wherein said heat exchanger comprises a coiled radiator.

10. A heat exchanger as defined in claim 9, wherein said coiled radiator is disposed in said air flow path between one of said front opening and said fan.

11. A heat exchanger as defined in claim 6, wherein said outlet is located above said pump and said inlet is located above a heat exchanger inlet port as said heat exchange system stands upright in an operative position.

12. A heat exchanger as defined in claim 11, wherein said inlet and outlet comprises a pair of taps mounted on a plate, which plate is secured to said housing.

13. A heat exchanger as defined in claim 6, wherein said housing includes a handle and a fill spout with a removable cap both located at the top of said housing on said outer wall, and base means located at the bottom of said housing on said outer wall for supporting said heat exchanger on a flat surface.

14. A heat exchanger as defined in claim 6, wherein said means for opening and closing said inlet and outlet comprise caps.

15. A self-contained heat exchange system, comprising:
- a housing having outer and inner walls defining a fluid reservoir therebetween, said inner wall further defining an internal passage in said housing extending from a front end opening in said housing to a rear end opening therein, said passage providing an air flow path between said openings;
- a heat exchanger disposed proximate said air flow path for changing the temperature of a heat exchange fluid circulating through said heat exchanger;
- a fan secured to said housing proximate said air flow path configured to generate an air stream along the length of said air flow path such that said air stream flows past said heat exchanger;
- a pump secured to said housing; and
- conduit means connecting said reservoir, pump, and heat exchanger, including an outlet for providing heat exchange fluid to an external device requiring heating or cooling and an inlet for return of the heat exchange fluid from said device, with means for opening and closing said inlet and outlet, thereby permitting circulation of the heat exchange fluid between the external device and said heat exchanger when the device is connected to said outlet and inlet, said reservoir, pump, device, heat exchanger, and conduit means constituting a closed fluid transfer system through which the heat exchange fluid is circulated by said pump;
- wherein said air flow path is generally cylindrical, said fan is configured to draw air into said air flow path through said rear opening and out past said heat exchanger through said front opening, and said heat exchanger comprises a radiator coil wound about the inner periphery of said inner wall so that said heat exchanger has a generally cylindrical shape.

16. A self-contained heat exchange system, comprising:
- a housing having a front end and a rear end and including respective inner and outer walls defining a fluid reservoir therebetween, said inner wall further defining an air flow path extending through said housing from said front end to said rear end of said housing;
- a radiator for changing the temperature of a heat exchange fluid, said radiator including a hollow tube configured to form a plurality of coils;
- a fan configured to generate an air stream along the length of said air flow path such that the air stream impinges upon said radiator;
- a pump disposed within said air flow path;
- inlet and discharge taps for directing the heat exchange fluid to and from a device, respectively;
- conduits for circulating the heat exchange fluid from said pump to said inlet tap, from said discharge tap to said radiator, from said radiator to said reservoir, and from said reservoir to said pump;
- wherein said discharge tap is disposed at a higher elevation then substantially all of the conduit that circulates the heat exchange fluid from said discharge tap to said radiator.

17. The heat exchange system of claim 16, wherein said inlet tap is disposed at a higher elevation than substantially all of the conduit that circulates the heat exchange fluid from said pump to said inlet tap.

* * * * *